3 Sheets—Sheet 1.

H. DILLAWAY.
MANUFACTURE OF GLASS LAMPS.

No. 179,647. Patented July 11, 1876.

Witnesses.
S. W. Piper
L. W. Miller

Hiram Dillaway
by his attorney
R. H. Eddy

3 Sheets—Sheet 2.
H. DILLAWAY.
MANUFACTURE OF GLASS LAMPS.
No. 179,647. Patented July 11, 1876.
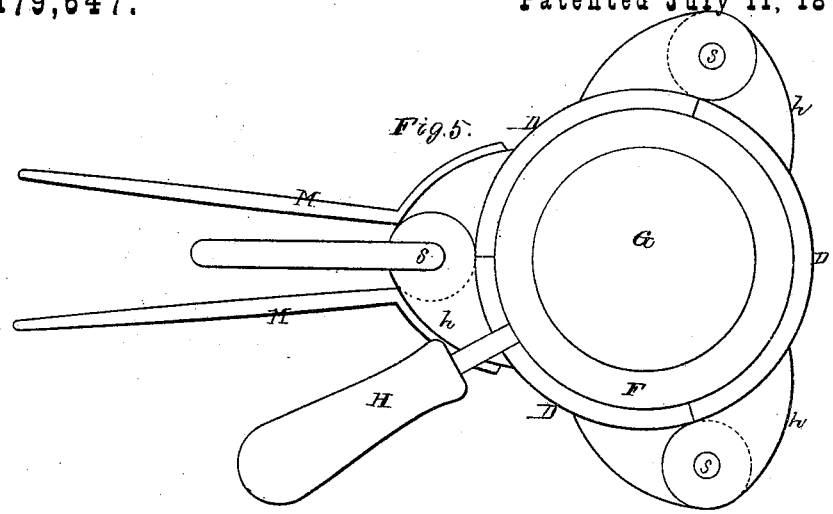
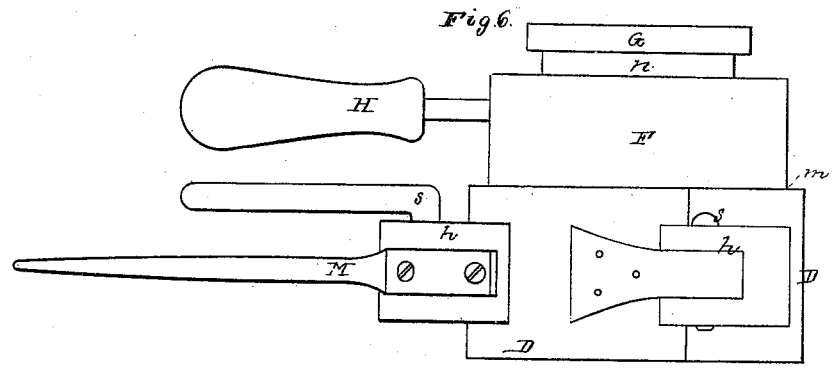
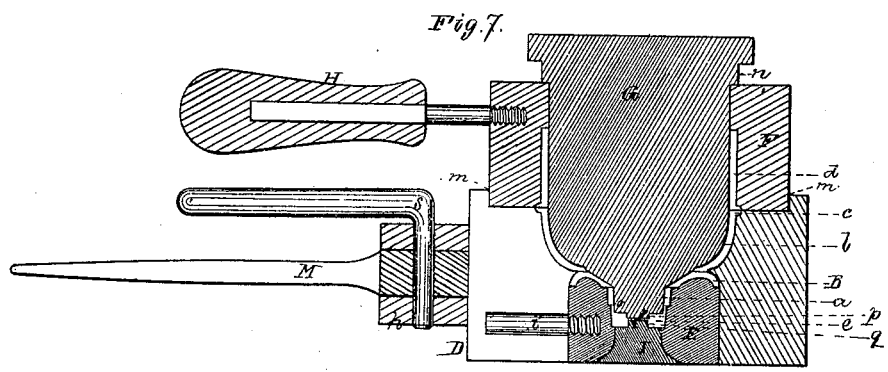
Witnesses,
S. W. Piper
L. W. Miller
Hiram Dillaway.
by his attorney
R. H. Eddy.

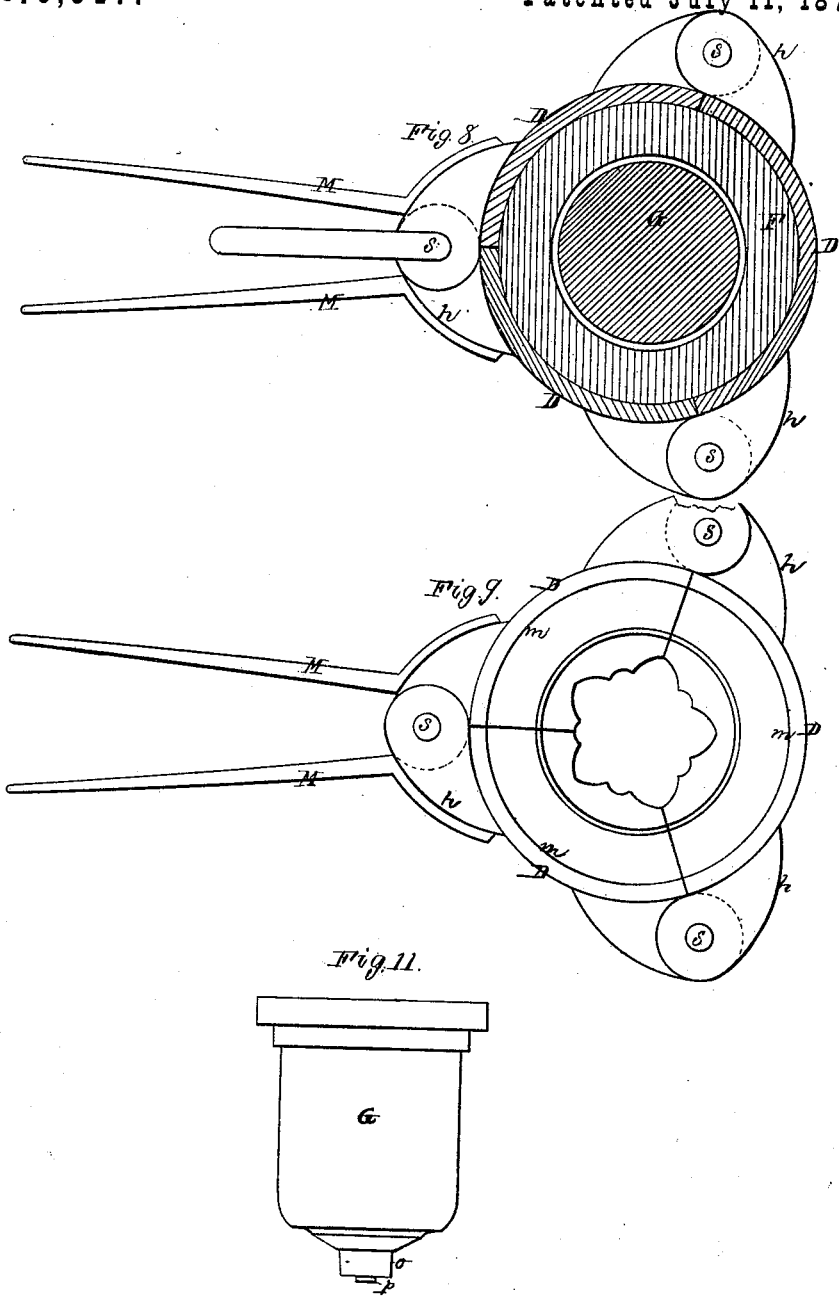

UNITED STATES PATENT OFFICE.

HIRAM DILLAWAY, OF SANDWICH, MASSACHUSETTS.

IMPROVEMENT IN THE MANUFACTURE OF GLASS LAMPS.

Specification forming part of Letters Patent No. 179,647, dated July 11, 1876; application filed June 5, 1876.

*To all whom it may concern:*

Be it known that I, HIRAM DILLAWAY, of Sandwich, of the county of Barnstable of the State of Massachusetts, have made a new and useful invention having reference to the manufacture of glass lamps, and to molds therefor; and do hereby declare the same to be fully described in the following specification, and represented in the accompanying drawings, of which—

Figure 1:
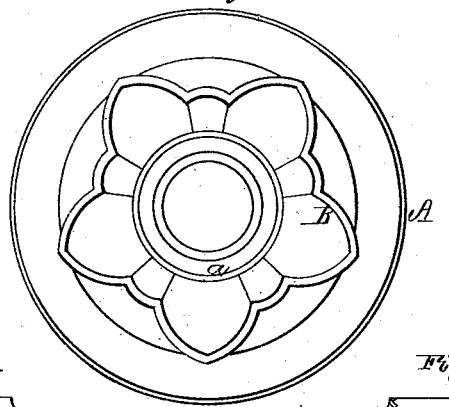
Figure 2:
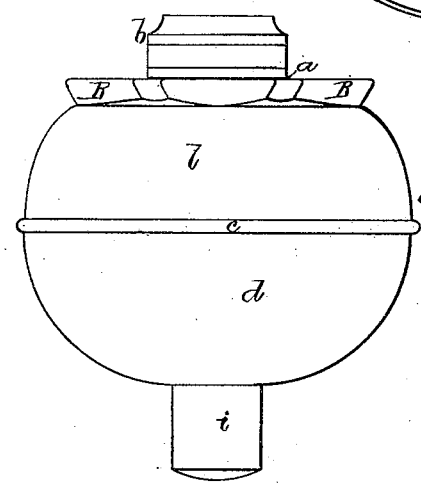
Figure 3:
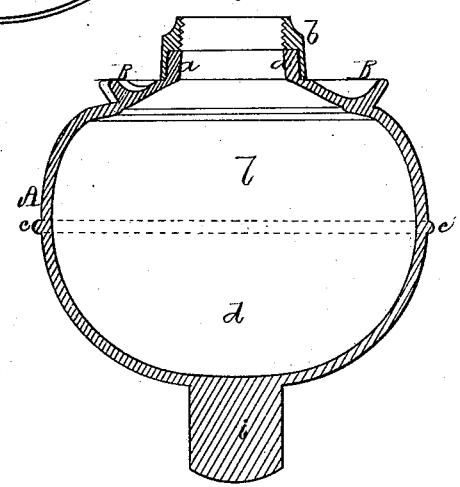
Figure 4:
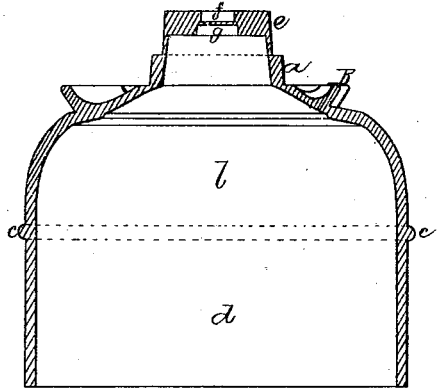

Figure 1 is a top view, Fig. 2 a side view, and Fig. 3 a transverse section, of a glass lamp-bowl provided with an ornamental crown, or waste-oil interceptor, and made in accordance with my invention. Fig. 4 is a vertical section of the lamp-bowl blank as formed by the mold, preparatory to being contracted and closed at the base, and fixed to a "peg" or "foot." Fig. 5 is a top view, Fig. 6 a side elevation, Fig. 7 a longitudinal section, and Fig. 8 a horizontal section, of the mold for forming the lamp-bowl blank.

In Figs. 1, 2, and 3 the glass lamp-bowl A is shown as provided with the ornamental crown, or waste-oil interceptor B, which extends around the neck $a$, for reception of the cap, sleeve, or collar $b$, and, in this case, is stellated in form.

In manufacturing the lamp-bowl it is first pressed by the mold into the shape shown in section in Fig. 4, the portion $d$, which is below the fillet $c$, being cylindrical. The part or stump $e$, that extends above the neck $a$, is recessed, as shown at $f$ and $g$, and is for attaching the bowl to the glass-blower's rod or tube used in the subsequent processes of contracting and closing the part $d$, and fixing it to a peg, $i$, or a foot, as occasion may require.

In the process of molding the blank the latter is inverted, or has, when formed in the mold, the part $d$ uppermost. After, or previous to having removed the blank from the mold, the glass-blower, with a proper tool, breaks away the thin septum intervening between the two recesses $f$ $g$, the same being in order to form a hole through the stump $e$ into the neck $a$, such being necessary for the free admission of air to the bowl, to prevent it, after being closed, from being altered in shape by the expansion or contraction of the air within it. Next, the glass-blower attaches his rod or tube to the stump $e$, and heats the part $d$, and, subsequently contracting it, closes it, as shown in Fig. 3, and applies or fixes to it a peg, or a glass foot.

Having thus described the method of manufacturing the lamp-bowl having an ornamental crown or oil-interceptor, I shall now proceed to explain the construction and mode of operation of the mold used in effecting such manufacture.

Figure 10:
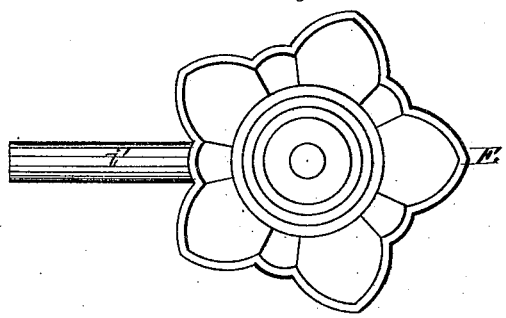

The base of the said mold consists of a series of annular sections, D D D, hinged together, and provided with handles M M and locking-ears $h$ $h$ $h$, all as shown, particularly in Fig. 9, which is a top view of said base part. The sections of the base part close around and upon the next part of the mold, which is shown at E, and in top view in Fig. 10, and is for the formation of the stump, the neck, and the waste-oil interceptor, or stellated crown of the bowl, such part E being provided with a short handle, $i'$. The sections D D D are to form the dome or part $l$ above the fillet $c$, and to aid in formation of the latter, such sections being recessed, as shown at $m$, to receive the removable tubular part F, which, with the plunger G, is to form the cylindrical and tubular part $d$, and the rest of the fillet. The part F, shaped as shown, is provided with a handle, H, extended from it, as represented. The plunger G, which fits the mouth of the part F, is provided with a shoulder, $n$, to determine the depth of its passage into the said part and the rest of the mold. It is also furnished with a slightly-tapering or conical projection, $o$, provided with a smaller and similar extension, $p$. (See Fig. 11, which is a side view of the plunger.) Furthermore, the part E, hereinbefore described, is socketed at bottom, as shown, to receive a bell-shaped frustum, I, provided at its lesser or upper base with a projection, $q$, like the extension $p$. A pin, $r$, provided with a handle, $s$, serves, when inserted through the ears $h$ $h$ $h$, to keep the sections D D D closed together.

In using the mold the workman first charges it with a sufficient amount of the molten glass, after which he forces the plunger down into the mass. Having done this he withdraws the plunger, and next raises the part F off the casting, and opens apart the sections D, and separates the casting from the parts E and I, which, instead of being in two pieces, may be in one entire piece, it being preferable, however, to have them in separate pieces, as shown.

I claim—

1. As a new or improved manufacture, the molded article or lamp-bowl, provided with the stellated waste-oil interceptor, and having such (the neck and the remainder) formed in and by a mold, and the lower or cylindrical portion subsequently contracted and closed, and fixed to a peg or foot, all as set forth.

2. The mold, substantially as described, composed of the series of sections D, the parts E and I, the tubular cylindrical portion F, and the plunger G, all formed, arranged, and applied essentially as specified.

3. The process, substantially as described, of making the said article or lamp-bowl, such consisting in forming its neck and body parts in a mold and open, as described, and subsequently heating and contracting or closing the cylindrical open part $d$ of the blank, and fixing it to a peg or foot, all substantially as set forth.

4. The combination of the projections $p$ and $q$ with the plunger G, the parts E and I, the tubular portion F, and the series of sections D, all being arranged and applied essentially as shown and described.

HIRAM DILLAWAY.

Witnesses:
WILLARD E. BOYDEN,
CHAS. B. HALL.